US012657790B2

(12) United States Patent
Ardiles Navarro et al.

(10) Patent No.: US 12,657,790 B2
(45) Date of Patent: Jun. 16, 2026

(54) METHODS AND ELECTRONIC DEVICES FOR QUANTITATIVELY DETERMINING CHANGES IN COLOR OF A SAMPLE OVER TIME

(71) Applicant: Lab4U, Inc., San Francisco, CA (US)

(72) Inventors: Esteban Hernán Ardiles Navarro, Santiago (CL); Johnny Flores Rosquero, Ixmiquilpan (MX); Javier Alejandro Baeza Ormeño, Santiago (CL); Alberto Raul Bay, Santiago (CL); Jose Rodrigo Ferrada Soto, Santiago (CL); Komal Dadlani Dadlani, Santiago (CL)

(73) Assignee: LAB4U, INC., San Francisco, CA (US)

( * ) Notice: Subject to any disclaimer, the term of this patent is extended or adjusted under 35 U.S.C. 154(b) by 217 days.

(21) Appl. No.: 18/280,436

(22) PCT Filed: Mar. 4, 2022

(86) PCT No.: PCT/US2022/019002
§ 371 (c)(1),
(2) Date: Sep. 5, 2023

(87) PCT Pub. No.: WO2022/187691
PCT Pub. Date: Sep. 9, 2022

(65) Prior Publication Data
US 2024/0153173 A1 May 9, 2024

Related U.S. Application Data

(60) Provisional application No. 63/157,259, filed on Mar. 5, 2021.

(51) Int. Cl.
*G06T 11/26* (2026.01)
*G06F 3/048* (2013.01)
(Continued)

(52) U.S. Cl.
CPC ............... *G06T 11/26* (2026.01); *G06F 3/14* (2013.01); *G06T 7/90* (2017.01); *G06T 11/10* (2026.01);
(Continued)

(58) Field of Classification Search
CPC ....... G06T 7/90; G06T 11/001; G06T 11/206; G06T 3/14; G06T 3/147;
(Continued)

(56) References Cited

U.S. PATENT DOCUMENTS 4,805,016 A 2/1989 Kato
8,928,815 B1 * 1/2015 Mundhenk ............. H04N 5/147
348/700
(Continued)

OTHER PUBLICATIONS

International Search Report dated May 27, 2022, in International Application No. PCT/US2022/019002.

*Primary Examiner* — Wesner Sajous
(74) *Attorney, Agent, or Firm* — Procopio, Cory, Hargreaves & Savitch LLP

(57) ABSTRACT

The present invention relates to a computer-implemented method, an electronic device, and a non-transitory computer-readable storage medium for quantitatively determining the changes of color of a sample over time. The present invention is an innovative tool for measuring and determining color changes, expressed as color (hue) and intensity (saturation) variations, with simple steps and an intuitive user interface that makes this invention a powerful and advantageous experimental tool for its use, for example, in the education field.

30 Claims, 13 Drawing Sheets

(51) Int. Cl.
*G06F 3/14* (2006.01)
*G06T 7/90* (2017.01)
*G06T 11/10* (2026.01)
*G06V 10/56* (2022.01)

(52) U.S. Cl.
CPC .... *G06V 10/56* (2022.01); *G06T 2207/10024* (2013.01)

(58) Field of Classification Search
CPC .......... G06T 2207/10024; G06T 2207/30024; G09G 5/02; G09G 5/06; G09G 5/10; G09G 2320/06–0666; G09G 2320/0271; G09G 2320/0276; G09G 2360/144; G06F 3/147; G06V 10/56; G06V 10/62; G06V 10/147; G06V 10/25; G06V 20/695; G06N 1/312; G06N 1/30; G06N 21/78; H04N 1/58; H04N 1/60; H04N 1/6019; H04N 1/6025; H04N 1/6027; H04N 1/6041; H04N 1/6055; H04N 1/6072; H04N 1/6077; H04N 5/20; H04N 5/202; H04N 5/57–58; H04N 9/64; H04N 9/68–69; H04N 9/73; H04N 9/77; H04N 9/79

See application file for complete search history.

(56) References Cited

U.S. PATENT DOCUMENTS

| | | | |
|---|---|---|---|
| 2005/0036668 A1 | 2/2005 | McLennan et al. | |
| 2012/0056910 A1* | 3/2012 | Safaee-Rad | H04N 23/83 345/77 |
| 2015/0104187 A1* | 4/2015 | Jeffrey | H04N 21/812 398/140 |
| 2015/0215312 A1* | 7/2015 | Cesnik | H04N 21/44008 726/9 |
| 2017/0074783 A1 | 3/2017 | Dadlani Dadlani et al. | |
| 2017/0237897 A1* | 8/2017 | Sivan | G06V 40/166 348/47 |
| 2019/0079662 A1* | 3/2019 | Wan | G06F 3/016 |
| 2019/0094116 A1* | 3/2019 | Cheng | G01N 1/312 |
| 2020/0005459 A1* | 1/2020 | Berezhna | G06V 20/698 |
| 2020/0091014 A1* | 3/2020 | Taddei | G01N 21/956 |
| 2020/0278787 A1* | 9/2020 | Wan | G06F 3/04883 |
| 2021/0373755 A1* | 12/2021 | Wan | G06F 3/0481 |
| 2022/0090995 A1* | 3/2022 | Cheng | G06V 10/25 |
| 2022/0148175 A1* | 5/2022 | Cheng | G06T 7/11 |
| 2024/0310992 A1* | 9/2024 | Wan | G06F 3/04847 |
| 2025/0173865 A1* | 5/2025 | Cheng | G06T 7/11 |

* cited by examiner

100

200

A    300    B    300

310

320

A

Error Android

B

Error iOS

A

B

A

B

METHODS AND ELECTRONIC DEVICES FOR QUANTITATIVELY DETERMINING CHANGES IN COLOR OF A SAMPLE OVER TIME

CROSS-REFERENCE TO RELATED APPLICATIONS

This application claims the benefit of provisional patent application No. U.S. 63/157,259 filed on Mar. 5, 2021.

TECHNICAL FIELD

The present invention relates to the field of colorimetry, more in particular to a method and an electronic device for quantitatively determining changes or variation of color of a sample over time.

BACKGROUND

Portable or mobile electronic devices have been transformed into powerful tools for detecting, analyzing, and measuring colors of different objects and processes, due to their high-quality cameras and sensors. Color measurement with these devices has been useful for chemical analysis, wherein the quantification of the color of a sample can be correlated with chemical or physical parameters. For instance, the color of a sample can be correlated with a solute concentration present in said sample, or the changes in the color of a sample can be associate with the course of a chemical reaction.

U.S. Pat. No. 10,012,584 discloses a system and a method for determining solute concentration in a colored liquid sample using the build-in camera of a portable electronic device for capturing images, then processing said images with the same device for obtaining a numerical value related to the color recognized and detected in the images and comparing the obtained numerical values to a calibration curve. However, the application or algorithm of the device is configured to analyze the color of the sample only at the moment the image is captured, therefore, it is not possible to detect color variations in a sample that occurs within a certain period of time.

In the field of chemistry, there are countless chemical reactions that have subtle or rapid color changes which are difficult to be seen with the naked eye. This poses a challenge when trying to determine or analyze quantitative parameters such as the speed or the equilibrium of the said reactions without a proper tool.

SUMMARY OF THE INVENTION

To overcome the above problem, a new invention has been developed, which allows to measure and determine quantitatively the color changes of one or several samples over time.

An embodiment of the present invention includes a computer-implemented method for quantitatively determining changes in color of a sample within a time frame. According to an embodiment, the method comprises at least the steps of: capturing with a camera unit an image of at least a portion of a sample in a time interval for obtaining a plurality of images within a time frame; processing the images captured for obtaining values of the color of the images in RGB; converting the RGB values to HSV values for obtaining numerical values of hue and saturation; plotting the numerical values of hue and saturation in function of time for obtaining a graph and/or table related to the color change of the sample within the time frame; and displaying the graph and/or table in a display unit.

According to an embodiment, the computer-implemented method further comprises displaying a user interface for selecting the time interval for capturing an image of the sample. According to various embodiments, the computer-implemented method further comprises displaying a user interface for selecting the number of samples.

According to various embodiments, the computer-implemented method comprises displaying a user interface with a delimited area for adjusting a representative portion of the sample. In a further embodiment, the step of processing the images comprises obtaining the value of the color of the images in RGB within the delimited area.

According to various embodiments, the value of the color of the images is obtained in RGBA.

In a preferred embodiment, the computer-implemented method for quantitatively determining changes in color of a sample within a time frame comprises the steps of: displaying a user interface for selecting a time interval for capturing an image of a sample; displaying a user interface for selecting the number of samples; displaying a user interface with a delimited area for adjusting a representative portion of the sample; capturing with a camera unit an image of at least a portion of the sample in a time interval for obtaining a plurality of images within a time frame; processing the color of the images contained within the delimited area for obtaining values of the color of the images in RGBA; converting the RGBA values to HSV values for obtaining numerical values of hue and saturation; plotting the numerical values of hue and saturation in function of time for obtaining a graph and/or table related to the color change of the sample within the time frame; and displaying the graph and/or table in a display unit.

Another embodiment of the present invention includes an electronic device for quantitatively determining changes in color of a sample within a time frame. According to an embodiment, the electronic device comprises: a processor for executing the computer-executable instructions; a camera unit operatively connected to the processor; a display unit operatively connected to the processor; and a computer-readable medium operatively connected to the processor, storing computer-executable instructions; wherein the computer-executable instructions, upon execution by the processor, cause the electronic device to: capture an image of at least a portion of a sample in a time interval for obtaining a plurality of images within a time frame; process the images captured for obtaining values of the color of the images in RGB; convert the RGB values to HSV values for obtaining numerical values of hue and saturation; plot the numerical values of hue and saturation in function of time for obtaining a graph and/or table related to the color change of the sample within the time frame; and display the graph and/or table obtained.

According to an embodiment of the electronic device, the computer-executable instructions, upon execution by the processor, cause the electronic device to display a user interface for selecting the time interval for capturing an image of the sample. According to various embodiments, the computer-executable instructions, upon execution by the processor, cause the electronic device to display a user interface for selecting the number of samples.

According to various embodiments, the computer-executable instructions, upon execution by the processor, cause the electronic device to display a user interface with a delimited area for adjusting a representative portion of the sample.

According to an embodiment, the computer-executable instructions, upon execution by the processor, cause the electronic device to obtain the value of the color of the images in RGB within the delimited area.

According to various embodiments, the value of the color of the images is obtained in RGBA.

In a preferred embodiment of the present invention, the electronic device comprises a processor for executing the computer-executable instructions; a camera unit operatively connected to the processor; a display unit operatively connected to the processor; and a computer-readable medium operatively connected to the processor, storing computer-executable instructions; wherein the computer-executable instructions, upon execution by the processor, cause the electronic device to: display a user interface for selecting the time interval for capturing an image of the sample; display a user interface for selecting the number of samples; display a user interface with a delimited area for adjusting a representative portion of the sample; capture an image of at least a portion of a sample in a time interval for obtaining a plurality of images within a time frame; process the color of the images captured contained within the delimited area for obtaining values of the color of the images in RGBA; convert the RGBA values to HSV values for obtaining numerical values of hue and saturation; plot the numerical values of hue and saturation in function of time for obtaining a graph and/or table related to the color change of the sample within the time frame; and display the graph and/or table obtained.

Another embodiment of the present invention includes a non-transitory computer-readable storage medium having computer-executable instructions stored thereon that, upon execution by a processor of an electronic device, cause the electronic device to perform a method for quantitatively determining changes in color of a sample within a time frame. According to an embodiment, the method comprises the steps of: capturing with a camera unit an image of at least a portion of a sample in a time interval for obtaining a plurality of images within a time frame; processing the images captured for obtaining values of the color of the images in RGB; converting the RGB values to HSV values for obtaining numerical values of hue and saturation; plotting the numerical values of hue and saturation in function of time for obtaining a graph and/or table related to the color change of the sample within the time frame; and displaying the graph and/or table in a display unit.

According to an embodiment of the non-transitory computer-readable storage medium, the method further comprises displaying a user interface for selecting the time interval for capturing an image of the sample. According to various embodiments, the method further comprises displaying a user interface for selecting the number of samples.

According to various embodiments of the non-transitory computer-readable storage medium, the method comprises, before capturing the images, displaying a delimited area for adjusting a representative portion of the sample. According to an embodiment, the step of processing the images comprises obtaining the value of the color of the images in RGB within the delimited area.

According to various embodiments of the non-transitory computer-readable storage medium, the value of the color of the images is obtained in RGBA.

In a preferred embodiment, the non-transitory computer-readable storage medium having computer-executable instructions stored thereon that, upon execution by a processor of an electronic device, cause the electronic device to perform a method for quantitatively determining changes in color of a sample within a time frame, the method comprising the steps of: displaying a user interface for selecting a time interval for capturing an image of a sample; displaying a user interface for selecting the number of samples; displaying a user interface with a delimited area for adjusting a representative portion of the sample; capturing with a camera unit an image of at least a portion of the sample in a time interval for obtaining a plurality of images within a time frame; processing the color of the images captured contained within the delimited area for obtaining values of the color of the images in RGBA; converting the RGBA values to HSV values for obtaining numerical values of hue and saturation; plotting the numerical values of hue and saturation in function of time for obtaining a graph and/or table related to the color change of the sample within the time frame; and displaying the graph and/or table in a display unit.

BRIEF DESCRIPTION OF THE DRAWINGS

FIG. 3A is a front view and FIG. 3B is a back view of the portable electronic device.

FIG. 10A shows a graph of the Color (Hue) versus time. FIG. 10B shows a graph of Intensity (Saturation) versus time. FIG. 10C shows the data table of the FIGS. 10A and 10B graphs.

FIG. 11A shows a graph with the error on Android devices with the Color Inspector. FIG. 11B shows a graph with the error on iOS devices with the Color Inspector.

FIG. 12A is a screenshot captured at the start of the experiment. FIG. 12B is a screenshot captured at the first second of the experiment.

FIG. 13A is a screenshot captured at the 9th second of the experiment. FIG. 13B is a screenshot captured at the 32nd second of the experiment.

DETAILED DESCRIPTION OF THE INVENTION

Figure 1:
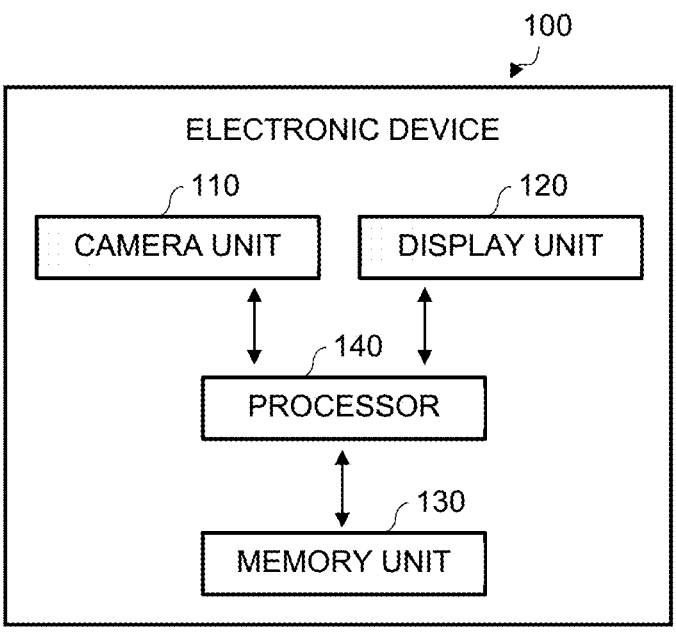
FIG. 1 illustrates a block diagram of an electronic device that may be used according to an embodiment of the present invention.

The present invention is an innovative tool that allows to determine and/or measure the color changes of one or several samples over time. The color change includes the determination of the change of Hue and Saturation within a time frame set by the user.

The present invention provides multiples advantages and benefits such as, for example, providing an experimental tool for the teaching of chemistry. For example, by means of the quantitative determination and/or measurement of the color and color intensity changes of a sample as a function of time, it is possible to estimate, measure, determine, visualize, or evaluate several chemical reactions, such as the ones illustrated below, but not limited to those mentioned.

Estimation of the Rate of Chemical Reactions by Changing Certain Thermodynamic Parameters For example, an effervescence reaction in water at different temperatures and degrees of division of the solid effervescent could be used for this purpose.

Estimation of the pH (or pH Range) of a Sample by Previously Creating Calibration Curves with Indicators with Known Turning Points or with Substances of Known pH As an example, an experiment has been designed to perform a pH scale of substances with known pH, using anthocyanins in ethanolic extract of purple cabbage. The known substances used are: 0.1 M HCl solution, commercial Acetic Acid (Vinegar), Lemon juice, distilled water, 0.1 M Sodium Hydroxide solution. This experiment may be useful to estimate the pH of substances such as cleaners, acetylsalicylic acid, magnesium hydroxide, and others that students may use at home. Another substance that could be used as a pH indicator is theaflavin from black tea, which lightens at acidic pHs, while it darkens at basic pHs. This indicator tends to have a sensitive turning range for acids but have a little more resistance to bases.

Determination of an Unknown Concentration of a Base Solution Using the Acid-Base Titration with Phenolphthalein Technique This is a basic technique used in general chemistry laboratory to determine the unknown concentration of some base. To this end, a titrating solution (acid of known concentration) and an indicator are used (usually phenolphthalein, whose turning point is between pH 8.2 to 9.8. At this pH, the previously colorless solution turns pink). By means of the amount of base volume used to neutralize the acid, it is possible to estimate the concentration of the solution. However, this technique is usually very accurate, as one extra drop can completely change the result, so it usually has to be repeated over and over again. The present invention can solve this situation since it detects the exact moment in which the color change takes place.

Determination of the Concentration of Hydrogen Peroxide in a Solution Using the Redox Titration with Hydrogen Peroxide and Potassium Permanganate A potassium permanganate solution is usually a good Redox indicator, as it reduces in the presence of hydrogen peroxide and changes color from purple to transparent. However, at a certain moment, the hydrogen peroxide molecules can be consumed causing the solution to remain color of the permanganate. Depending on the time in which this moment is reached, or the volume of potassium permanganate solution used, the concentration of hydrogen peroxide in the solution can be estimated.

Estimation of the Reaction Rate with the Presence of Catalysts, Enzymatic Kinetics and Evaluation of Factors that Influence It To estimate these variables, an experiment of starch degradation in a solution with Lugol's iodine and the addition of salivary amylase has been designed. The variables that can be modified are the amount of substrate (starch), the amount of enzyme (salivary amylase), the temperature and pH of the system, which allows to describe the behavior of the enzymes. By using the Lugol's reaction (or triiodide test), it is possible to analyze the presence or absence of starch, since this reagent (which is naturally yellow in color) turns an intense blue color in the presence of starch. For its part, salivary amylase at a pH close to 7 and at 37° C. is capable of degrading starch into less complex oligosaccharides, allowing the triiodide complex to disassemble within the amylose fibers of the polysaccharide, losing its blue color. It is known that the enzyme and substrate concentration affect enzyme kinetics, even reaching saturation points. Likewise, due to the protein character of the enzymes, they lose their properties when the temperature or pH of the system is modified.

Evaluation of the Simple Diffusion of Colored Substances in an Aqueous Solution By changing the orientation of the mobile electronic device to vertical, 3 capture samples areas can be placed over a water column (in a test tube) and the diffusion time of a colored compound (such as methylene blue) in the water column can be measured.

Measurement of Instantaneous Reactions by Implementing "Burst Mode" for Capturing Images This form of measuring aims to capture between 10 and 12 pictures per second, to catch instantaneous changes in chemical reactions. This mode, which will be implemented prior to the selection of the number of samples, will modify the flow, since the screen for selecting the capture intervals will be suppressed and the "GO" icon on the capture screen will be modified, since the burst mode is active as long as the user presses this icon, and the images are processed immediately afterwards.

Measurement of Slow Reactions by Implementing the Image Comparison Mode, i.e., Taking a Picture at the Beginning and at the End of the Process to Visualize the Changes It is expected that this option will allow visualizing phenomena such as oxidation reduction of metals and organic compounds. This option will open an alternative flow that will allow loading images from the photo gallery indicating the initial photograph and the final photograph, to then do the processing and comparison.

Producing a Turbidity Meter

This modality allows to estimate the concentration of particles in a solution by turbidity, which could be useful in crystallization reactions, decantation, precipitation, and even in biochemistry to estimate bacterial growth or water quality. One way to measure this is placing a colored film behind the sample and measuring the sharpness of the color during the course of the reaction.

The following description of the invention, as well as the accompanying drawings, is provided for the purposes of illustration and comprehensive understanding of various embodiments of the present invention as defined by the claims. It is not intended to be exhaustive or to limit the invention to the precise forms disclosed, and it is to be understood that all equivalents and/or combinations of embodiments are intended to be included in this description. It will be apparent to those of ordinary skill in the art that various changes and modifications may be made to the described embodiments without altering the scope and spirit of the present invention. In addition, descriptions of well-known functions and constructions may be omitted for clarity and conciseness.

The terms "a", "an", and "the", as used herein, are intended to include the plural forms as well, unless the context clearly indicates otherwise. It will also be understood that the term "and/or", as used herein, refers to and encompasses any and all possible combinations of one or more of the associated listed items. It will be further understood that the terms "comprises" and/or "comprising," when used in this specification, specify the presence of features, steps, operations, elements, and/or components, but do not preclude the presence or addition of one or more other features, steps, operations, elements, components, and/or groups thereof.

The term "if", as used herein, may be construed to mean "when" or "upon" or "in response to determining" or "in response to detecting," depending on the context.

The terms "preferably", "more preferably", "particularly", "more particularly", "specifically", "more specifically", or similar terms, as used herein, are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention, and without any restriction regarding the possibility of combining the features introduced in such way with other optional or non-optional features of the invention.

The term "user", as used herein, may indicate a person who uses an electronic device or a device (e.g., an artificial intelligence electronic device) that uses an electronic device.

The term "user interface", as used herein, is intended to define the space where the user interacts with an electronic device using one or more senses.

The term "non-transitory", as used herein, is intended to describe a computer-readable storage medium (or "memory" or "memory unit") excluding propagating electromagnetic signals but is not intended to otherwise limit the type of physical computer-readable storage device that is encompassed by the phrase computer-readable medium or memory. For instance, the terms "non-transitory computer-readable medium" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The present invention relates to a computer-implemented method, an electronic device, and a non-transitory computer-readable storage medium, for quantitatively determining changes in color of a sample within a time frame. According to an embodiment, the sample may be a liquid, semi-solid, or solid sample, preferably a liquid sample. According to an embodiment, the method is implemented by a computer, wherein the computer is an electronic device. FIG. 1 is a block diagram illustrating an electronic device that may be used in the method according to an embodiment of the present invention. An electronic device 100 may include a processor 140, a camera unit 110 operatively connected or coupled to the processor 140, a display unit 120 operatively connected or coupled to the processor 140, a computer-readable storage medium mentioned as a memory unit 130, operatively connected or coupled to the processor 140, the computer-readable storage medium storing computer-executable instructions.

According to various embodiments of the present invention, at least some of the units of the electronic device 100 (for example, the camera unit 110, the display unit 120) or the method (for example, operations) may be implemented by an instruction stored in a computer-readable storage medium. The instruction, when executed by a processor 140, may cause the electronic device to execute the function corresponding to the instruction.

The computer-readable storage medium or memory unit 130 may include a hard disk, a floppy disk, magnetic media (for example, a magnetic tape), optical media (for example, a CD-ROM or a DVD), magneto-optical media (for example, a floptical disk), a hardware device (for example, a ROM, a RAM, a flash memory), and the like. The aforementioned hardware device may be configured to operate as one or more computer-executable instructions in order to perform operations of embodiments of the present invention.

The memory unit 130 may be configured to store various computer-executable instructions, which may be expressed as a software or program instructions and/or data accessible by one or more processors. For example, the memory unit may include an operation system software, a graphic software, a user interface software, a camera software, or one or more application software. In an example of the present invention, the memory unit 130 may include additional software in addition to the aforementioned software or may not use some of them.

The memory unit 130 may include an extended memory (for example, an external memory) or an internal memory. The electronic device 100 may also operate in relation to a web storage performing a storage function of the memory unit 130 on the Internet.

The camera unit 110 in the electronic device is configured for capturing images. This camera unit may include one or more optical sensors and one or more lenses. The optical sensor receives light from the environment, projected through one or more lenses, and converts the light to data representing an image. The optical sensor may capture still images, mobile images, or video, which may be displayed through the display unit 120 as a preview of the image or a non-recorded video. The data representing an image is preferably represented by digital values in the red-green-blue (RGB) color space. According to an embodiment of the present invention, data representing an image is based on the RGB color model, more preferably in the red-green-blue-alpha (RGBA) color model. The RGBA color model allows to include an additional channel (alpha) to indicate transparency.

The display unit 120 provides an input interface and an output interface between the electronic device 110 and a user. The display unit 120 receives and/or sends electrical signals from/to, for example, a touch screen. The display unit 120 displays visual output to the user, which may include graphics, text, icons, video, and any combination thereof, and receives a tactile input by the user, which may include a finger contact on the display unit or a contact with a pencil design for that purpose.

The method comprises the following steps which, as an example, may be performed in the given order. It shall be noted, however, that a different order is also possible. It is also possible to perform one or more of the method steps once or repeatedly. In addition, it is possible to perform two or more of the method steps simultaneously or in a timely overlapping fashion. The method may comprise further method steps which are not listed.

Figure 2:
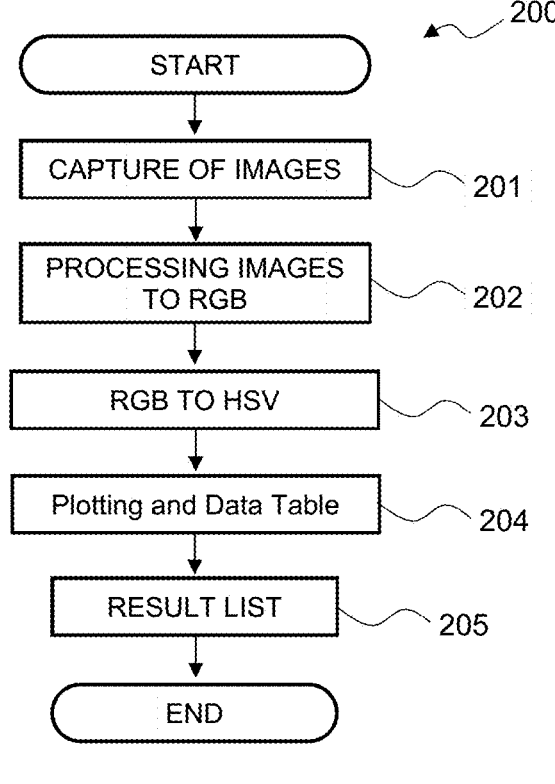
FIG. 2 illustrates a flow chart of an embodiment of the method of the present invention.

According to an embodiment, the computer-implemented method comprises at least the steps illustrated in FIG. 2. For determining the color changes in a sample within a time frame, the method comprises capturing with a camera unit (for example, the camera unit 110) an image of at least a portion of a sample in a time interval for obtaining a plurality of images within a time frame 201; processing (for example, with the processor 140) the images captured for obtaining values of the color of the images in red-green-blue (RGB) color space 202; converting the RGB values to hue-saturation-value (HSV) values for obtaining numerical values of hue and saturation 203; plotting the numerical values of hue and saturation in function of time for obtaining a graph and/or table related to the color change of the sample within the time frame 204; and displaying with a display unit (for example, with the display unit 120) the result list, corresponding to the graph and/or table obtained 205. These steps may be commands or operations of computer-executed instructions stored in a computer-readable storage medium (for example, the memory unit 130).

According to an embodiment, the computer-implemented method further comprises displaying a user interface for selecting the time interval for capturing an image of the sample. In a preferred embodiment, the user interface offers a time interval for the user to select between 0.5 to 60 seconds, without being limited to said range.

The time frame wherein the images are captured is arbitrary and is defined by the user. The user decides when to stop the step of capturing images. Preferably, the user stops the step of capturing images when the sample has completely changed its color, and no other change of color is registered.

According to various embodiments, the computer-implemented method further comprises displaying a user interface for selecting the number of samples. As previously mentioned, one of the advantages of the present invention is the possibility of measuring the change of color of two or more samples, simultaneously. Therefore, the election of the quantity of samples to be measured is done by the user. The results obtained show the change of color of the two or more samples in the same graph and/or table, identifying the results of each sample with different colors or symbols.

According to various embodiments, the computer-implemented method comprises displaying a user interface with a delimited area for adjusting a representative portion of the sample. The delimited area allows the user to adjust either the electronic device or the sample for enclosing a representative portion of the sample within said delimited area. The representative portion of the sample is defined by the user.

In a further embodiment, the step of processing the images comprises obtaining the value of the color of the images in RGB within the delimited area. According to various embodiments, the value of the color of the images is obtained in RGBA.

Figure 3:
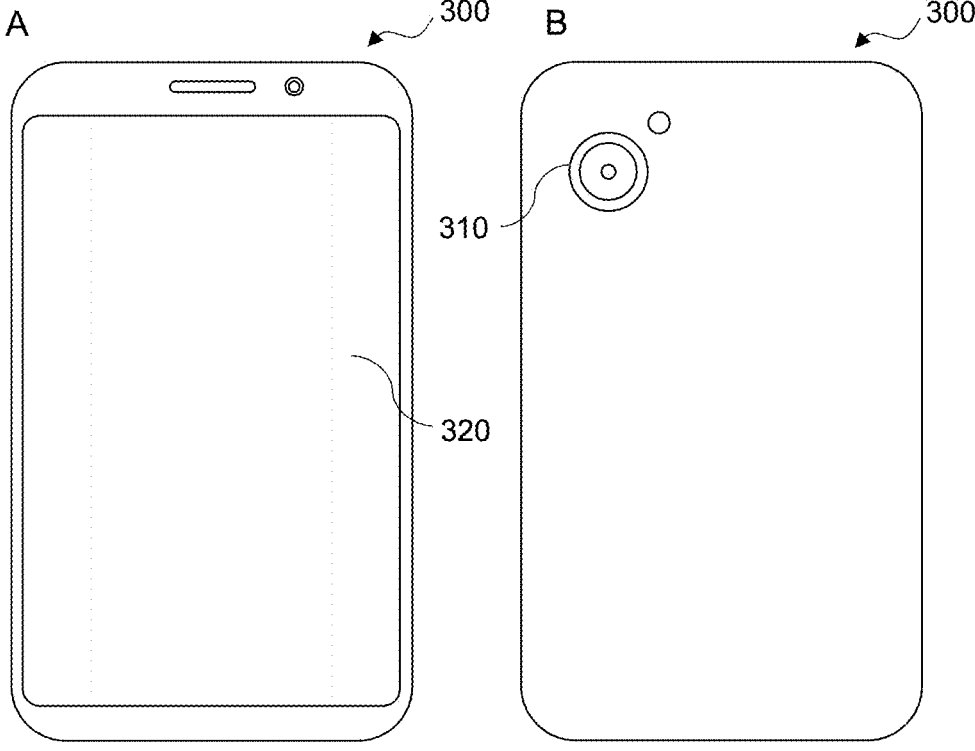
FIG. 3 illustrates an example of a portable electronic device that may be used according to an embodiment of the present invention.

According to various embodiments of the present invention, the electronic device may include, for example, a mobile or portable electronic device such as a smartphone or a tablet personal computer. FIG. 3 illustrates an example of a portable electronic device 300 in a front view (FIG. 3A) and back view (FIG. 3B). FIG. 3A shows the display unit 320 and FIG. 3B shows the camera unit 310.

Figure 4:
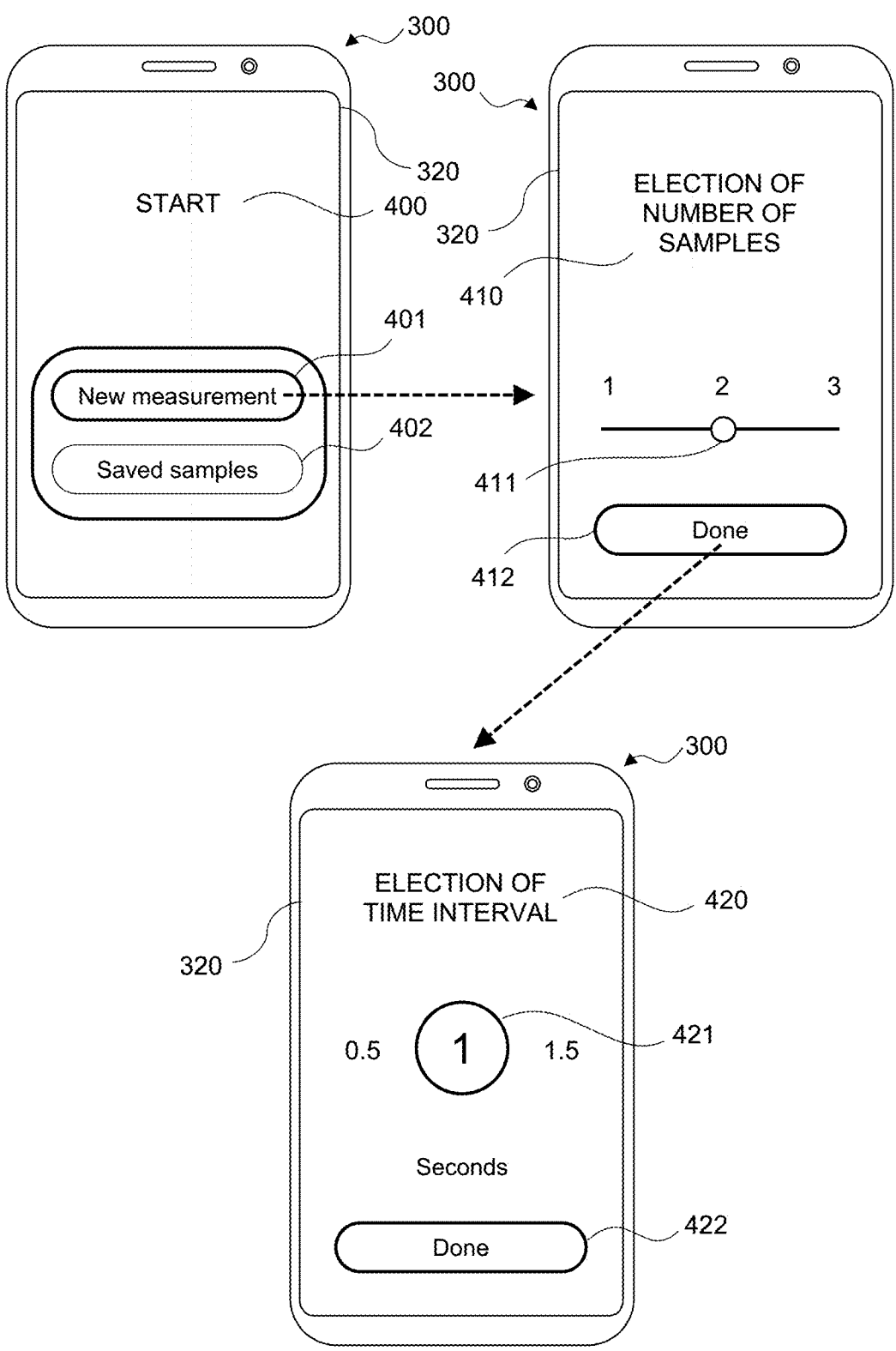
FIG. 4 illustrates an example of user interfaces displayed in a display unit of the electronic device according to an embodiment of the present invention. Specifically, illustrates an example of the user interface for starting the determination of color changes of a sample, the selection of number of samples, and the selection of time interval.

FIGS. 4-9 illustrate a preferred embodiment of the present invention. In FIG. 4, the display unit 320 of the electronic device 300 displays a user interface of the software used in various embodiments of the present invention. The "START" interface 400 shows to the user at least two alternative procedures. The user may start a new measurement of the change of the color of a sample, selecting the visual output 401 displayed in the display unit for that purpose. The user may also review past measurements or color changes determinations, accessing to the saved data through the visual output 402 displayed in the display unit 320 for that purpose. If a new measurement is selected, the display unit 320 displays a user interface 410 for selecting the number of samples to be analyzed. One of the advantages of the present invention is the possibility of determining the color changes of two or more samples simultaneously. As an example, in the user interface 410 two samples are selected with the visual output 411 displayed in the display unit 320 for that purpose. When the user confirms the number of samples selection with the visual output 412 displayed in the display unit 320 for that purpose, a new user interface 420 is displayed in the display unit 320 for selecting the time interval in which one image will be captured within said time interval. According to various embodiments of the present invention, the user may select a time interval of between 0.5 to 60 seconds, but it is not limited to these options. In FIG. 4, a time interval of 1 second is selected by executing the visual output 421, which means that one image will be captured by the camera unit 310 every 1 second. The time interval is confirmed upon the user's execution of the visual output 422 displayed in the display unit 320 for that purpose.

Figure 5:
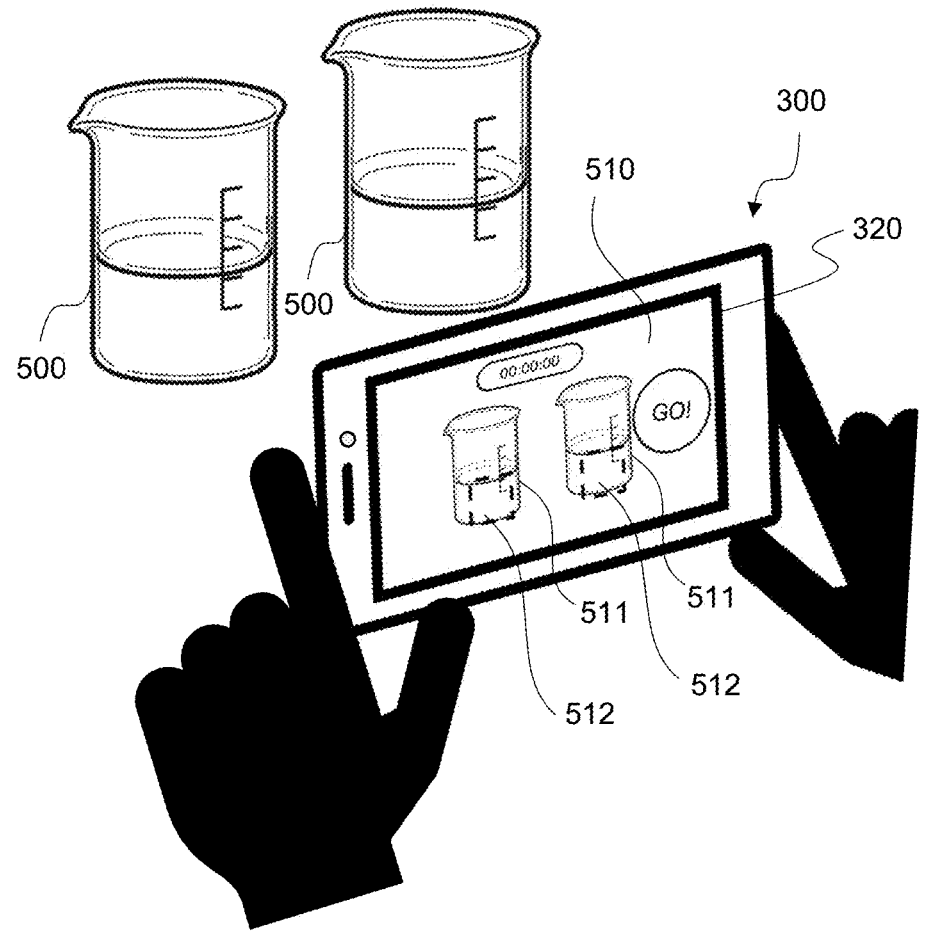
FIG. 5 illustrates an example of a user using an electronic device for determining the change of color of samples.
Figure 6:
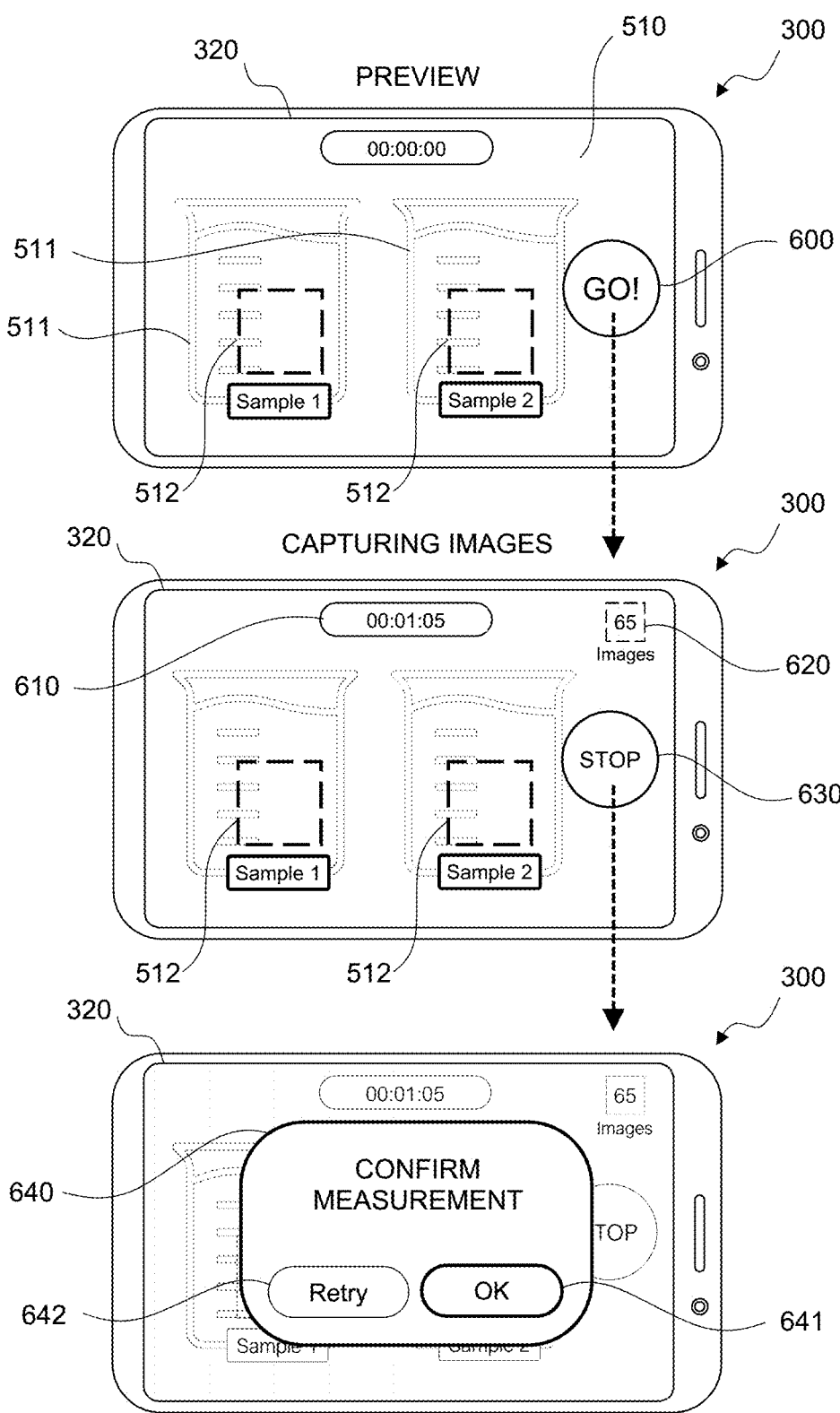
FIG. 6 illustrates an example of user interfaces displayed in a display unit of the electronic device according to an embodiment of the present invention. Specifically, it illustrates an example of the user interface for visualizing a preview of the images to be captured, the image capturing process, and the confirmation of the correct capturing process.

FIG. 5 shows an illustration of an example of a user using the electronic device 300 for determining the change of color of two samples 500. According to an embodiment of the present application, the user places the samples 500 and adjusts the electronic device 300 to visualize the samples through the display unit 320. According to an embodiment of the present invention, the processor 140 may control the camera unit 110 or 310 to be turned on in response to the execution of the user and may display an image or a video of the sample through the camera unit 110 or 310 on the display unit 120 or 320 to visualize the sample before capturing the images (preview of samples 511). This process allows the user to adjust the electronic device 100 or 300 in a way that the camera unit 110 or 320 captures a representative portion of the sample correctly. As shown in FIG. 5, according to various embodiments of the present invention, the display unit 320 displays a delimited area 512 that serves as a guide to the user to adjust the position of the electronic device 300 or the sample 500, thus allowing the camera unit 310 to capture a representative image of the sample. FIG. 6 shows a more detailed view of the preview 510 displayed by the display unit 320, where a preview image of samples 511 is visualized. As shown, representative areas of the preview image of samples 511 are aligned with the delimited area 512. Once the image of the samples is correctly positioned, the process of capturing images in the time interval previously set starts in response to the execution of the user of a visual output 600 displayed in the display unit 320 for that purpose. During the process of capturing images, it is preferable that the user keeps the electronic device in the same position to avoid the representative area to be outside the delimited area. Through the display unit 320, the user may visualize the time frame 610 and the number of images captured 620 during said time frame. The process stops in a time defined by the user upon the execution of a visual output 630 displayed in the display unit 320 for that purpose. It is the user who decides when the process of capturing images should stop. As a result of the execution of the visual output 630, a request for confirmation of the measurement (the capture of the images) 640 is displayed in the display unit 320. The user may request the software to repeat the process of capturing images in response to the execution by the user of a visual output 642 displayed in the display unit 320 for that purpose, or to confirm that the capture was done correctly in response to the execution by the user of a visual output 641 displayed in the display unit 320 for that purpose. If the user confirms the measurement, the processor 140 processes the images captured. The processor 140 executes an instruction to transform the color of the images contained within the delimited area 512 into RGBA. Then, the processor 140 executes the transformation of the color values in RGBA to HSV. This process allows the processor 140 to obtain the values of Hue and Saturation, which are plotted in function of time.

Figure 7:
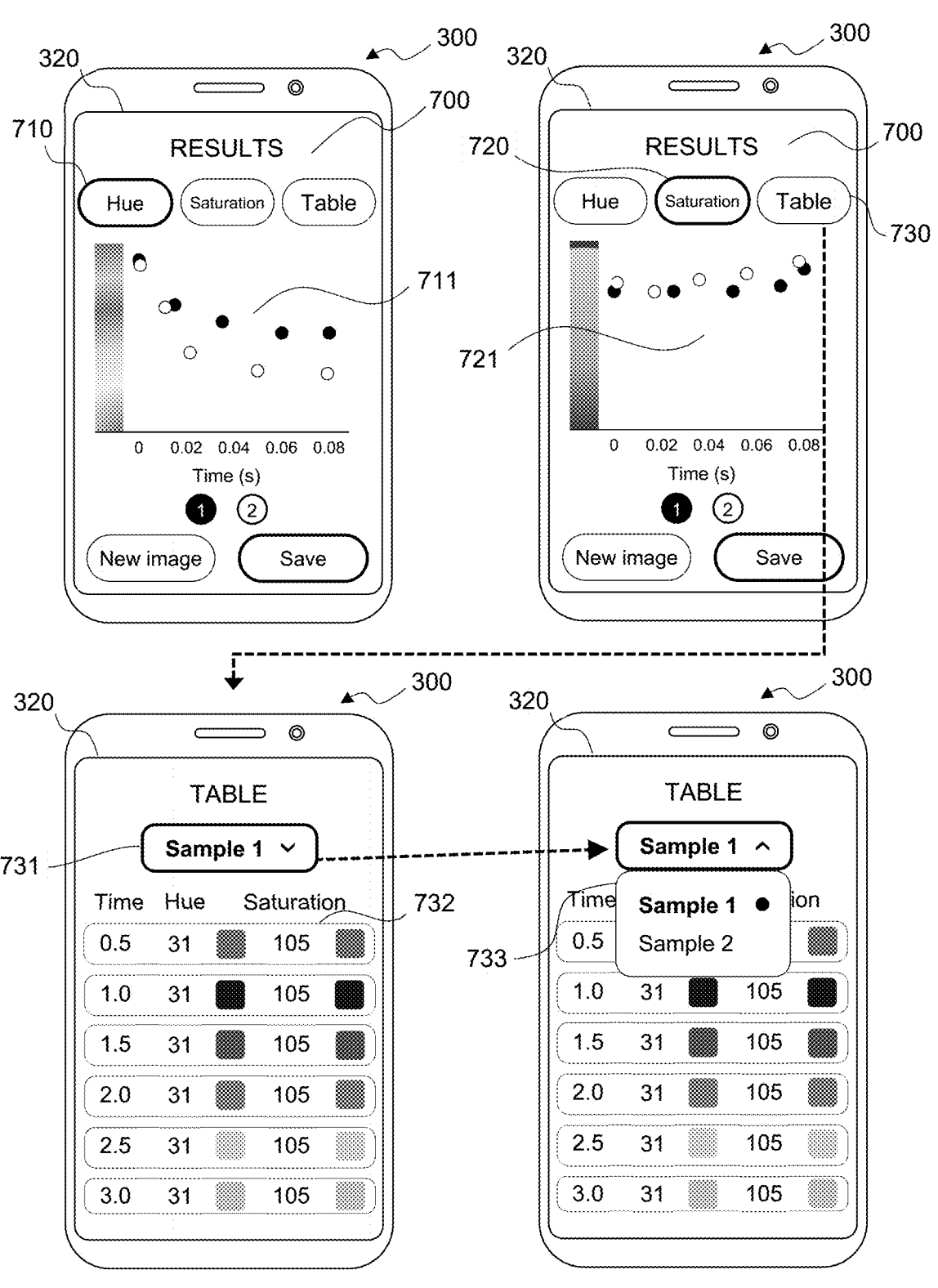
FIG. 7 illustrates an example of user interfaces displayed in a display unit of the electronic device according to an embodiment of the present invention. Specifically, it illustrates an example of the user interface for visualizing the results of the measurement of the color change of samples.

Once the processor 140 plots the Hue value in function of time and the Saturation value in function of time, the display unit 320 displays a user interface 700 with the results of the change of color of the sample within the time frame used, showing the graphs and tables obtained (FIG. 7). The user may visualize graphs of Hue (shown as Color) 711 by executing the visual output 710, or the graphs of Saturation (shown as Intensity) 721 by executing the visual output 720. As shown in the graphs 711 and 721, the results of both samples are displayed together and are differentiated by the color of the symbols. The user may see the data tables 732 by executing the visual output 730. In this embodiment, the tables are shown for each sample separately. The user may change the visualization of the sample data table by executing the visual output 731 and choosing the sample with the visual output 733.

Figure 8:
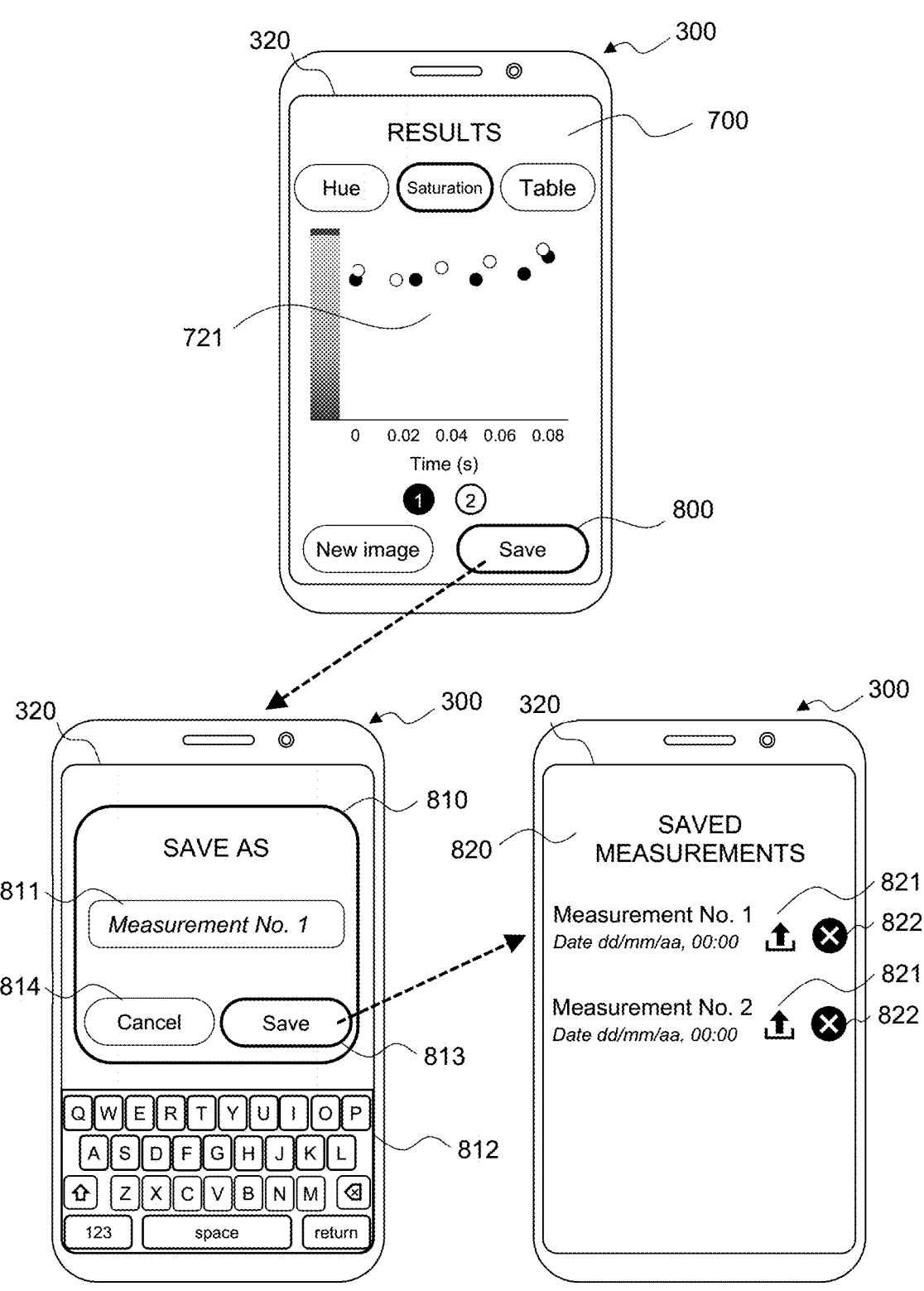
FIG. 8 illustrates an example of user interfaces displayed in a display unit of the electronic device according to an embodiment of the present invention. Specifically, it illustrates an example of the user interface for saving the results obtained.

As shown in FIG. 8, the results obtained may be saved as a file in a memory unit, which may or may not be the same memory unit 130. The user may save the results by executing the visual output 800. Upon execution of visual output 800, the visual output 810 is displayed, where the user may name the file. By executing the visual output 811, a keyboard in the touch screen will be displayed. The user saves the file by executing the visual output 813. If the user decides to cancel the saving process, the visual output 814 may be executed. After saving the results data, a user interface 820 is displayed by the display unit 320. The saved data results of different measurements may be seen in the display unit 320. The user may open a file to review the data results of a specific measurement by executing the visual output 821 or may delete data results by executing the visual output 822. Another alternative to access to the user interface 820 with saved data, is by executing the visual output 402 displayed in the user interface 400.

Figure 9:
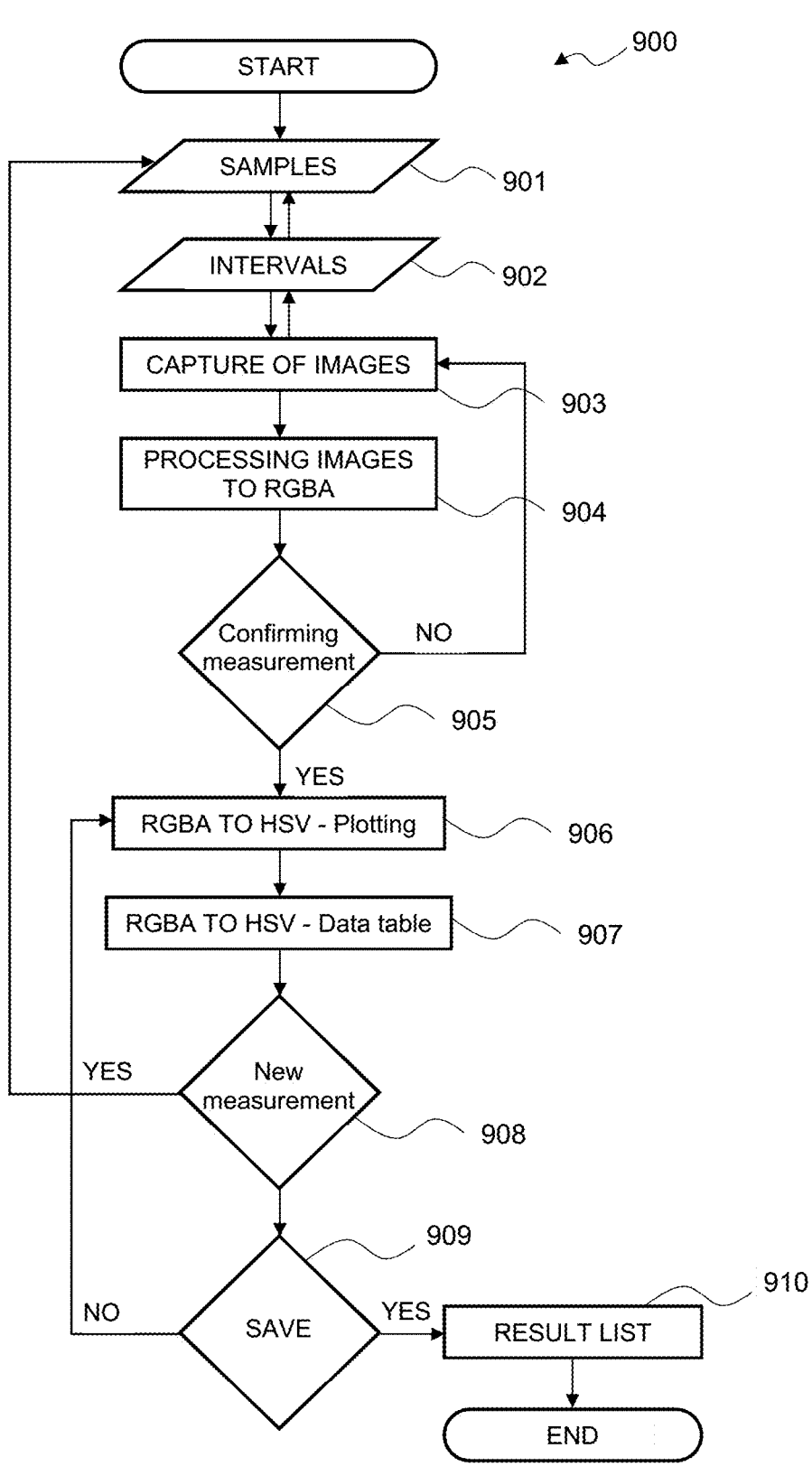
FIG. 9 illustrates a flow chart of a preferred embodiment of the method of the present invention.

In FIG. 9, a preferred embodiment of the present invention 900 is illustrated. The following steps may apply for a preferred embodiment of the computer-implemented method, a preferred embodiment of the electronic device, or a preferred embodiment of the non-transitory computer-readable storage medium.

Upon the execution of the software, a user interface is displayed for selecting the number of samples 901 for which the color change determination is made. Once the user has selected the number of samples, a user interface is displayed for selecting the time interval 902 for capturing with the camera unit of the electronic device an image of a sample. The user may cancel the time interval selection to retry the selection of the number of samples. If the user confirms the time interval, a preview of the image to be captured is displayed in the display unit, containing a delimited area for the user to adjust a representative area of the sample within said delimited area. If the user confirms the sample is correctly adjusted, the processor starts capturing an image in the time interval selected during a time frame defined by the user 903. The processor converts the images defining the color of the delimited area in RGBA values 904. When the user stops the process of capturing images, a user interface is displayed for confirming the measurement 905. If the user confirms, the processor transforms the RGBA values to HSV values, plots the Hue value and Saturation value in function of time 906, and creates tables with the value results 907. If the user does not confirm the measurement or cancel the measurement 905, the electronic device displays the preview of the image to be captured in the display unit 903. Thus, the user may start a new process of capturing images. After displaying the graph and data table in the display unit, the user may perform a new measurement 908 or save the measurement data obtained 909. If the user decides not to save the data, the display unit will continue displaying the graph and data tables. If the user saves the results data, a result list 910 will be displayed, where the user may access or delete the results of previous measurements. If the user decides to perform a new measurement 908 the processor will display, through the display unit, the user interface for selecting the number of samples, thus initiating a new process for the determination of change of color of a sample.

EXAMPLES

User Flow of Color Inspector

Wireflow is an open-source tool that allowed the implementation of the various screens and functionalities in the present application.

Invention Algorithm

For the image processing, the first step is to obtain the RGBA of the selected area for each capture. To obtain this value, an open library obtained from OpenCV, a company dedicated to image processing, is used. Once the RGBA is obtained, it is stored in a database and converted to HSV (Hue, saturation, value).

Programming Flows

For the image processing, the first step is to obtain the RGBA of the selected area for each image captured. To obtain this value, an open library obtained from OpenCV, a company dedicated to image processing, may be used. Once the RGBA is obtained, it is stored in a database in the memory and converted to HSV (Hue, Saturation, Value).

The OpenCV library could be very useful in the present invention, so the complete library was used while capturing the images, and then, after a confirmation message, the transformation and presentation in table and graph format was made, because the use of memory and battery of the electronic devices is optimized by doing it in this way (FIG. 9)

RGBA to HSV Conversion Algorithm

RGBA values are normally delivered on a scale from 0 to 255, where 0 is black, and 255 is white for each of the channels (Red, Green, Blue, alpha). In this case, alpha corresponds to the transparency channel, edge smoothing, and opaque regions. From this point of view, each color would be a mixture of the R, G, and B channels on a scale from 0 to 255. However, in fact, these values are little understood by people (since a color is composed of 3 values). Therefore, there was a need to transform these three values into a single-color value (Hue). The Hue behaves like a color wheel from 0° to 360° in which 0° and 360° correspond to the red color, while the rest is in one of the intermediate values, so that plotting it as a function of time is easier and more understandable for the user.

To obtain the Hue value, an equation is used in which the saturation and the value (HSV) are also determined, therefore this gives the possibility of plotting not only the color, but also the saturation of pigments of that color in a sample, which can be extremely useful when visualizing processes where there is no significant color change, but it becomes more concentrated or more transparent. The Saturation value (S) is shown as intensity, for educational purposes.

The equation for this conversion is as follows:

The R, G, B values are divided by 255 to change the range from 0 . . . 255 to 0 . . . 1.

$$R'=R/255$$

$$G'=G/255$$

$$B'=B/255$$

$$C_{max}=\max(R',\ G',\ B')$$

$$C_{min}=\min(R',\ G',\ B')$$

$$\Delta=C_{max}-C_{min}$$

Hue Calculation:

$$H = \begin{cases} 0° & \Delta = 0 \\ 60° \times \left(\dfrac{G'-B'}{\Delta}\right)\mathrm{mod}6, & C_{max}=R' \\ 60° \times \left(\dfrac{B'-R'}{\Delta}\right)+2, & C_{max}=G' \\ 60° \times \left(\dfrac{R'-G'}{\Delta}\right)+4, & C_{max}=B' \end{cases}$$

Saturation Calculation:

$$S = \begin{cases} 0, & C_{max}=0 \\ \dfrac{\Delta}{C_{max}}, & C_{max}\neq 0 \end{cases}$$

Value Calculation:

$$V=C_{max}$$

Processing and Plotting More Than One Sample Simultaneously

For the simultaneous processing of several capture areas (which then can measure chemical reactions parallelly and simultaneously), a matrix is prepared, in which each sample corresponds to a discrete set of images that are processed in series, i.e., all the photographs of sample 1, in parallel all those of sample 2 and sample 3 by means of OpenCV, to then store them and make the respective conversions. This way of working allows the plotting of different curves on the same axis system and to automatically generate more than one data table.

Capture of Photographs

For each photograph (time t):

Selecting areas to analyze. Extracting of RGBI matrices.

For each area:

Calculating the RGB representative of the area.

Converting to HSV

Saving the results in a temporary matrix for that area.

At the end of the process:

Plotting each area of the temporal matrix and H, S and V, according to graph.

Alternatives to Calculate the RGB Value Representative of the Area

Statistical Methods

Since the color matrix is a matrix of numbers between 0 and 256 for each color, statistical analysis can be performed on these values to determine average, mean, median, standard deviation, local maxima, local minima.

Functional Fit

The data obtained for the matrix can be grouped in the form of a frequency histogram. This operation results in a function that relates the color value to the number of times this value is present in the selected area. This function can be approximated by another regular parameterizable function, such as a parabola or a Gaussian bell. These parameters can be used to generate a representative value that considers the shape of the data and not only their average or dispersion.

Image Processing

The selected segment can be processed as an image itself, so that it could be the subject of image analysis to identify regions within the sector that are outliers. An example of this is the reflection of vessels containing the substance. In that case, these sectors could be excluded from color considerations. It could also allow the identification of different sectors of the area where the color is not fully defined, producing color gradients. This processing can be done with open image libraries, improving the definition of the representative.

Data Map

The pixels of an image are coordinated values in a two-dimensional matrix. This has implications for analysis since the neighbors of a cell usually have similar values. We can identify those pixels closer to the center as more important in determining the representative value. Then, we could apply a weighted average to the values by a function (in $\mathbb{N} \times \mathbb{N} > \mathbb{N}$) acting as a kernel. This function can be either quadratic or two-dimensional Gaussian. Other matrix processing may justify better choices of the representative value of this area.

RGB to HSV Processing

The processing (whether statistical, mathematical, image or data map) can be performed in a similar way if each pixel of the selected area is transformed into the HSV system. The only exception for the analysis is that it goes from a system where the edges correspond to maximum and minimum of each color (0—absence of color, 256—maximum color density) in each channel (red, blue, and green). In the case of Hue, the value 0 and the value 360 correspond to the same color (pure red), so the analysis must be done with continuous boundary conditions on any function or statistical analysis.

A Combination of Methods

Image refinement may require several iterative methods, which can select image sectors and related parameters. In this way, the important information to be plotted can be obtained, producing better results when calculating reaction rates, titration volumes, and other issues related to the temporary nature of chemical reactions.

Algorithm Validation

The determination of color change of a sample was done with the tool of the present invention (also mentioned herein as Color Inspector). For that purpose, the color transition of one sample was measured for one minute, capturing an image of the sample every one second. The average area of the sample was determined on each capture for obtaining a representative value of the color in RGB (corresponding to the red, green, and blue channels). Then, the RGB values were transformed to HSV, which determine the color (Hue, H), saturation (Saturation, S), and value (Value, B).

Figure 10:
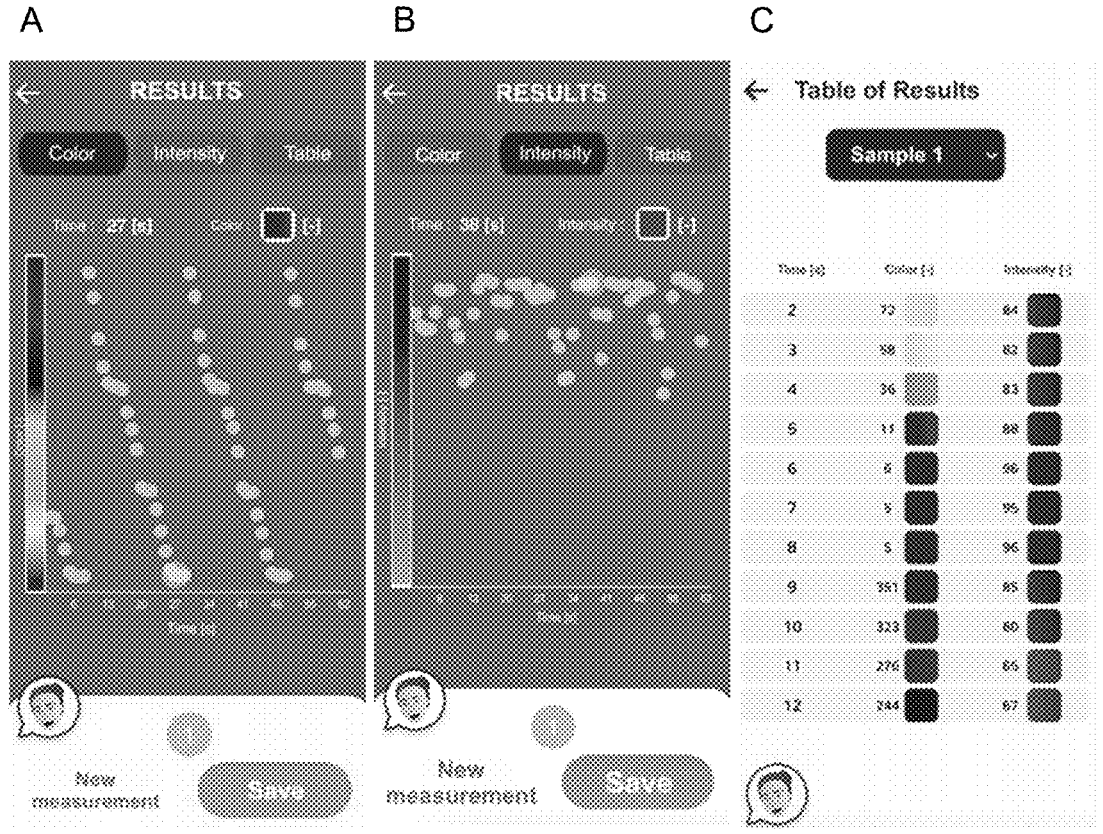
FIG. 10 shows an example of results obtained with an embodiment of the present invention, recited as Color Inspector.

The result of that measurement is shown in FIGS. 10A, 10B, and 10C.

To analyze the reliability of the data obtained by the Color Inspector, a technical test was performed in which a sequence of images with known values of RGB and HSB obtained by means of the Adobe color generator was measured. The values of S and B were kept constant in order to modify the value of H in said sequence. Cell phones with Android and iOS operating systems were used to perform the test, obtaining the results shown in FIGS. 11A and 11B.

Figure 11:
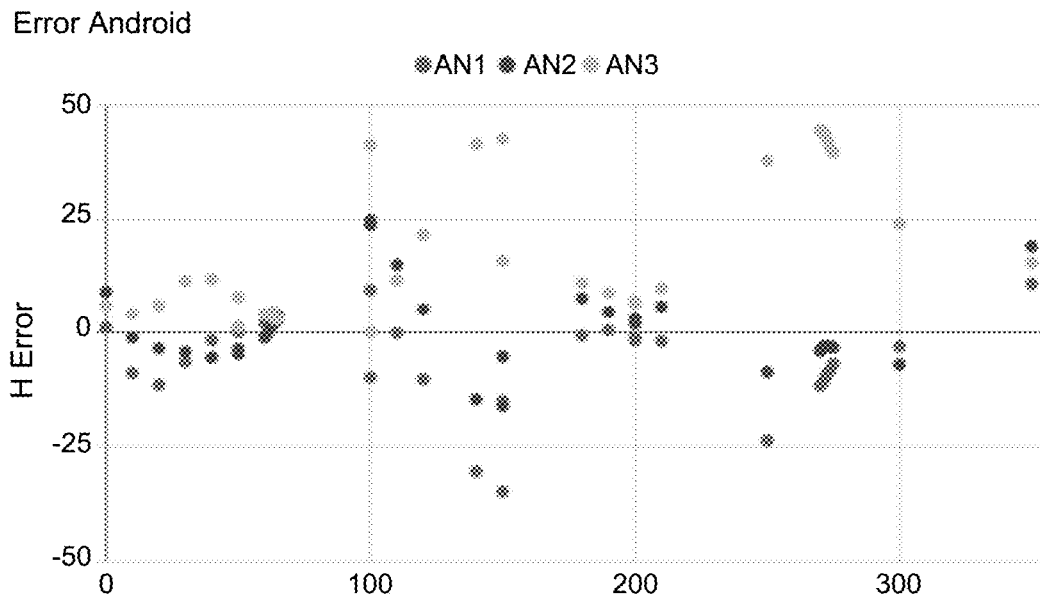
FIG. 11 shows the results of a technical test performed to analyze the reliability of the data obtained in FIG. 10.
Figure 11:
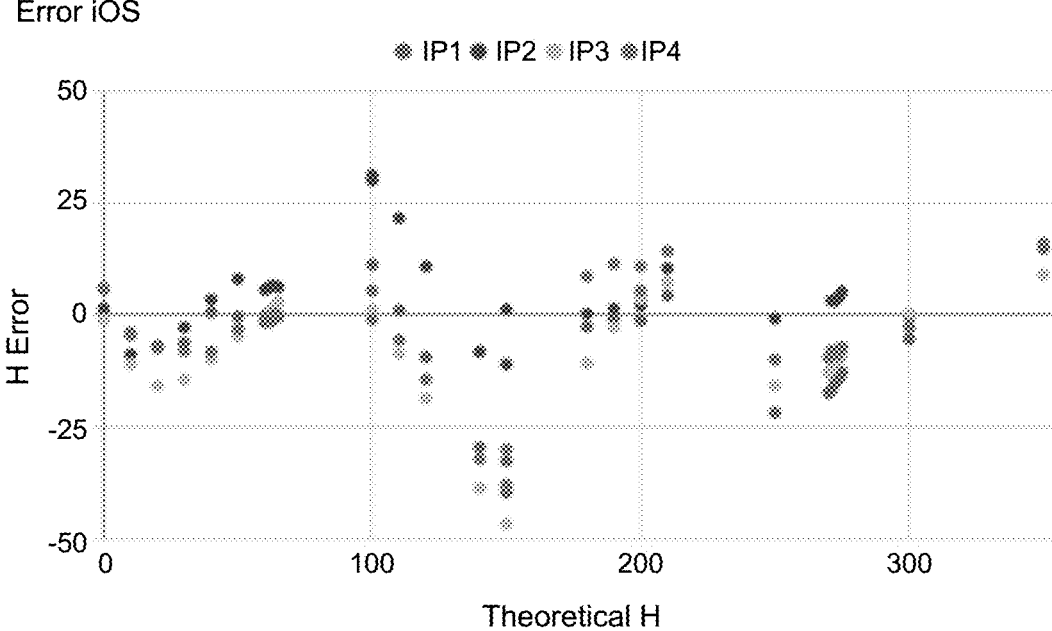

FIG. 11A shows the value of H error over the theoretical H of the image sequence on three Android devices. Each value is the average value after six repetitions with the same device. These results suggest that there are sectors where the errors determined by the devices are lower and therefore desirable in pedagogical experiences. Said sectors are between 0 and 50 (corresponding to red colors) and close to 200 (near blue), but there is a high distribution in the color ranges close to yellow and green. However, despite the high distribution in those sectors, a constant trend can be observed among the devices, which suggests that the tool of the present invention fulfills the objective of determining color changes over time, beyond the exact value to which the color corresponds. It is important to mention that chemically the numerical value of the color does not have a direct interpretation, however, it is of high value to analyze the transitions because it quantifies and temporalizes macroscopic phenomena that are difficult to measure with the naked eye and to establish microscopic conclusions from these.

As for models with iOS operating system (FIG. 11B), said trends are even more noticeable, as there is a greater selection of Hardware manufacturers of the devices and their consistency between models, which does not occur with Android devices of multiple architectures and companies.

Therefore, it is confirmed that this tool allows detecting color changes over time of a substance, regardless of the differences in the numerical value obtained, since the error is constant. It is possible to address this situation with a treatment of the colors used in the known ranges, controlling the substances involved in the chemical reactions and physical processes. These graphs also reinforce the idea that there are preferred colors when designing learning experiences.

Experimental Validation

Once the technical validation was completed, the experimental validation was carried out. To this end, the iodine test was performed to determine the amount of starch present in a sample, by means of Lugol's reaction. Lugol is a yellow iodine-based reagent that turns intense violet-blue in contact with starch. Based on this, an experiment was designed where two solutions were prepared: the first one of distilled water with Lugol reagent and the second one of starch (cornstarch) dissolved in distilled water. Captures were taken every 0.5 seconds waiting for an abrupt transition between yellow and blue.

Figure 12:
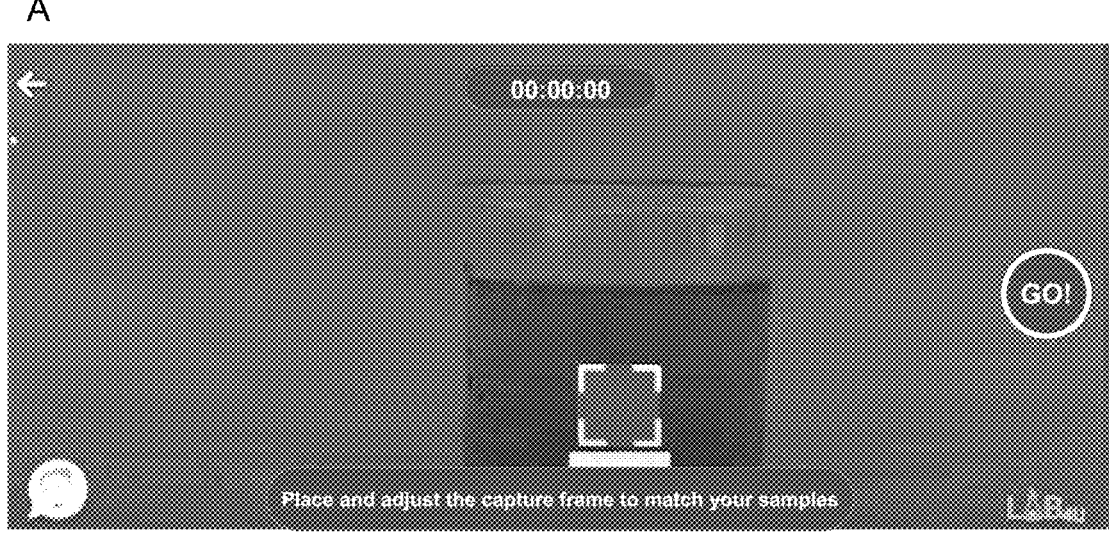
FIG. 12 shows screenshots of the smartphone running an experiment for the validation of the Color Inspector.
Figure 13:
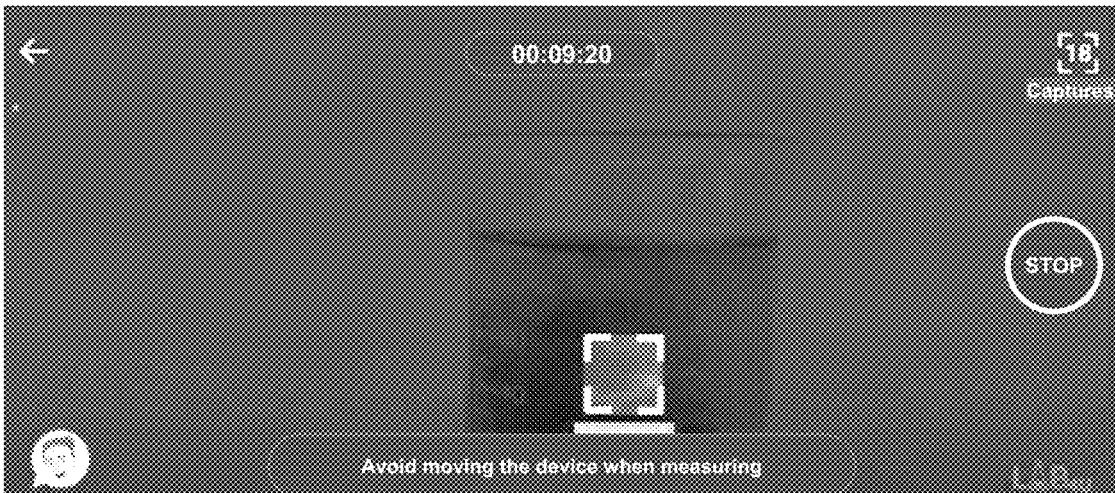
FIG. 13 shows screenshot of the smartphone running an experiment for the validation of the Color Inspector.
Figure 13:
Figure 14:
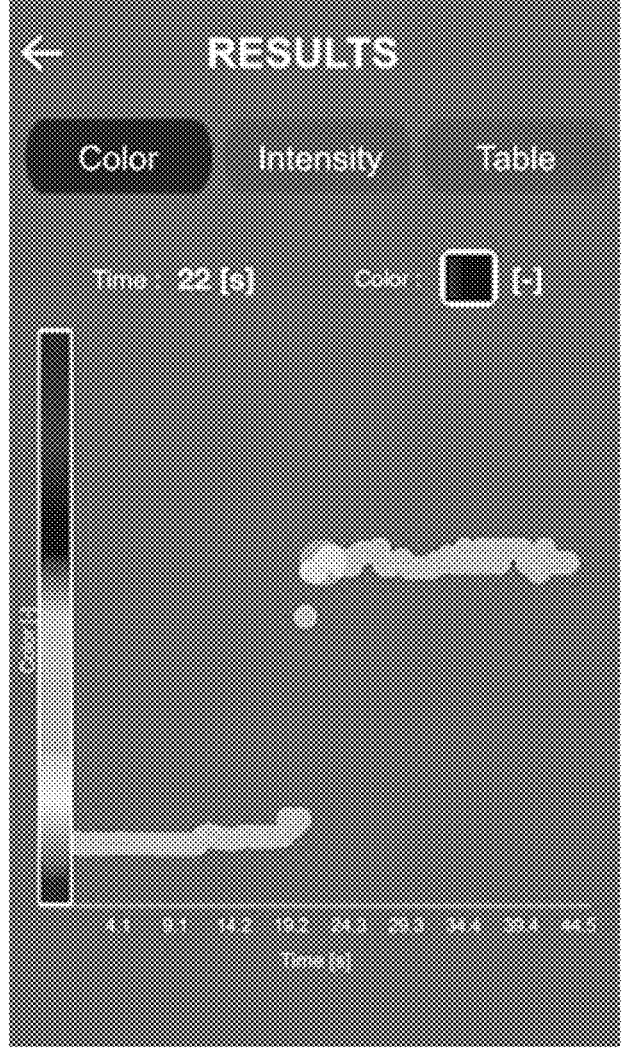
FIG. 14 shows the color graph of the Lugol reaction obtained with the Color Inspector. Color (Hue), Intensity (Saturation).

FIG. 12A shows a screenshot of the smartphone captured at the start of the experiment. A solution of Lugol reagent is poured in a beaker. The delimited area on the screen is adjusted to a representative area of the beaker with the solution. FIG. 12B shows a screenshot of the smartphone captured at the first second. In the upper right part, the number of images captured in the elapsed time can be seen. FIG. 13A shows a screenshot of the smartphone captured at the 9th second. A starch solution begins to be added into the Lugol's solution, a non-uniform color change in the system can be observed. FIG. 13B shows a screenshot of the smartphone captured at the 32nd second. The reaction between Lugol and starch is complete, an intense uniform blue color can be observed in the system. FIG. 14 shows the color graph (Hue) of the Lugol reaction obtained with the Color Inspector. This graph shows the precise moment in which the starch reacts with the lugol modifying the solution from yellow to blue.

As well as the Lugol's reaction for determining the presence of starch in food (biochemical technique), there are a series of other reactions that are detected by means of color change, such as oxidation-reduction reactions and acid-base reactions. Also, together with the possibility of measuring time, the opportunity to measure reaction rate, even when certain conditions are modified, becomes evident. Successfully passing the Lugol test allows us to extrapolate the functionality to these new reactions, since the color change in this reaction is abrupt and instantaneous, suggesting that with less abrupt transitions the change is much better detected.

The invention claimed is:

1. A computer-implemented method for determining changes in color of a sample during a time frame, the method comprising:

displaying a user interface with a delimited area for adjusting a representative portion of the sample;

capturing with a camera unit an image of the representative portion of the sample in a time interval for obtaining a plurality of images during the time frame;

processing the images captured for obtaining values of the color of the images in RGB;

quantitatively determining the changes in the color of the sample during the time frame by converting the RGB values to HSV values for obtaining numerical values of hue and saturation;

plotting the numerical values of the hue and the saturation in function of time for obtaining a graph and/or table related to the color change of the sample during the time frame; and displaying the graph and/or table in a display unit which shows correlation of the change in color of the sample during the time frame with chemical or physical parameters of the sample.

2. The computer-implemented method of claim 1, further comprises displaying a user interface for selecting the time interval for capturing an image of the sample.

3. The computer-implemented method of claim 1, further comprises displaying a user interface for selecting a number of samples.

4. The computer-implemented method of claim 1, wherein the processing of images comprises obtaining the value of the color of the images in RGB within the delimited area.

5. The computer-implemented method of claim 1, wherein the value of the color of the images is obtained in RGBA.

6. The computer-implemented method of claim 1, wherein for determining instantaneous changes in color of the sample, the camera unit captures between 10 and 12 images per second of at least a portion of the sample for obtaining a plurality of images during the time frame.

7. The computer-implemented method of claim 1, wherein the sample is liquid or semi-solid.

8. The computer-implemented method of claim 1, wherein the chemical or physical parameters are selected from the group consisting of solute concentration, thermodynamic parameters, pH or pH range, reaction rate with presence of catalysts, enzymatic kinetics, diffusion time of colored compounds, and turbidity.

9. The computer-implemented method of claim 3, wherein in a case of two or more samples are selected in the user interface, the images of the two or more samples are processed simultaneously.

10. The computer-implemented method of claim 9, wherein for determining changes in color of two or more samples simultaneously, the camera unit captures an image of at least a portion of each of the two or more samples in a time interval for obtaining a plurality of images during the time frame, and processes the images captured in series.

11. An electronic device for determining changes in color of a sample during a time frame, comprising:

a processor for executing computer-executable instructions;

a camera unit operatively connected to the processor;

a display unit operatively connected to the processor; and a computer-readable medium operatively connected to the processor, storing computer-executable instructions;

wherein the computer-executable instructions, upon execution by the processor, cause the electronic device to:

display a user interface with a delimited area for adjusting a representative portion of the sample;

capture an image of the representative portion of the sample in a time interval for obtaining a plurality of images during the time frame;

process the images captured for obtaining values of the color of the images in RGB;

convert the RGB values to HSV values for obtaining numerical values of hue and saturation for quantitatively determining the changes in color of the sample during the time frame;

plot the numerical values of the hue and the saturation in function of time for obtaining a graph and/or table related to the color change of the sample during the time frame; and display the graph and/or table obtained which shows correlation of the change in color of the sample during the time frame with chemical or physical parameters of the sample.

12. The electronic device of claim 11, wherein the computer-executable instructions, upon execution by the processor, cause the electronic device to display a user interface for selecting the time interval for capturing an image of the sample.

13. The electronic device of claim 11, wherein the computer-executable instructions, upon execution by the processor, cause the electronic device to display a user interface for selecting a number of samples.

14. The electronic device of claim 11, wherein the computer-executable instructions, upon execution by the processor, cause the electronic device to obtain the value of the color of the images in RGB within the delimited area.

15. The electronic device of claim 11, wherein the value of the color of the images is obtained in RGBA.

16. The electronic device of claim 11, wherein for determining instantaneous changes in color of the sample, the camera unit captures between 10 and 12 images per second of at least a portion of the sample for obtaining a plurality of images during the time frame.

17. The electronic device of claim 11, wherein the sample is liquid or semi-solid.

18. The electronic device of claim 11, wherein the chemical or physical parameters are selected from the group consisting of solute concentration, thermodynamic parameters, pH or pH range, reaction rate with a presence of catalysts, enzymatic kinetics, diffusion time of colored compounds, and turbidity.

19. The electronic device of claim 13, wherein in a case of two or more samples are selected in the user interface, the images of the two or more samples are processed simultaneously.

20. A non-transitory computer-readable storage medium having computer-executable instructions stored thereon that, upon execution by a processor of an electronic device, cause the electronic device to perform a method for determining changes in color of a sample during a time frame, the method comprising:

displaying a user interface with a delimited area for adjusting a representative portion of the sample;

capturing with a camera unit an image of portion of the representative portion of the sample in a time interval for obtaining a plurality of images during the time frame;

processing the images captured for obtaining values of the color of the images in RGB;

quantitatively determining the changes in color of the sample during the time frame by converting the RGB values to HSV values for obtaining numerical values of hue and saturation;

plotting the numerical values of the hue and the saturation in function of time for obtaining a graph and/or table related to the color change of the sample during the time frame; and displaying the graph and/or table in a display unit which shows correlation of the change in color of the sample during the time frame with chemical or physical parameters of the sample.

21. The non-transitory computer-readable storage medium of claim 20, wherein the method further comprises displaying a user interface for selecting the time interval for capturing an image of the sample.

22. The non-transitory computer-readable storage medium of claim 20, wherein the method further comprises displaying a user interface for selecting a number of samples.

23. The non-transitory computer-readable storage medium of claim 20, wherein the method comprises processing the images comprises obtaining the value of the color of the images in RGB within the delimited area.

24. The non-transitory computer-readable storage medium of claim 20, wherein the value of the color of the images is obtained in RGBA.

25. The electronic device of claim 19, wherein for determining changes in color of two or more samples simultaneously, the camera unit captures an image of at least a portion of each of the two or more samples in a time interval for obtaining a plurality of images during the time frame, and processes the images captured in series.

26. The non-transitory computer-readable storage medium of claim 20, wherein for determining instantaneous changes in color of the sample, the camera unit captures between 10 and 12 images per second of at least a portion of the sample for obtaining a plurality of images during the time frame.

27. The non-transitory computer-readable storage medium of claim 20, wherein the sample is liquid or semi-solid.

28. The non-transitory computer-readable storage medium of claim 20, wherein the chemical or physical parameters are selected from the group consisting of solute concentration, thermodynamic parameters, pH or pH range, reaction rate with a presence of catalysts, enzymatic kinetics, diffusion time of colored compounds, and turbidity.

29. The non-transitory computer-readable storage medium of claim 22, wherein in a case of two or more samples are selected in the user interface, the images of the two or more samples are processed simultaneously.

30. The non-transitory computer-readable storage medium of claim 29, wherein for determining changes in color of two or more samples simultaneously, the camera unit captures an image of at least a portion of each of the two or more samples in a time interval for obtaining a plurality of images during the time frame, and processes the images captured in series.

* * * * *